(12) United States Patent
Saito et al.

(10) Patent No.: US 9,963,815 B2
(45) Date of Patent: May 8, 2018

(54) VULCANIZED ANTI-VIBRATION RUBBER

(71) Applicant: YAMAUCHI CORPORATION, Osaka (JP)

(72) Inventors: Toshio Saito, Osaka (JP); Hiroyuki Maruko, Osaka (JP)

(73) Assignee: YAMAUCHI CORP., Osaka (JP)

( * ) Notice: Subject to any disclaimer, the term of this patent is extended or adjusted under 35 U.S.C. 154(b) by 0 days. days.

(21) Appl. No.: 15/525,897

(22) PCT Filed: Apr. 28, 2016

(86) PCT No.: PCT/JP2016/063335
§ 371 (c)(1),
(2) Date: May 10, 2017

(87) PCT Pub. No.: WO2016/175277
PCT Pub. Date: Nov. 3, 2016

(65) Prior Publication Data
US 2017/0355842 A1 Dec. 14, 2017

(30) Foreign Application Priority Data

Apr. 30, 2015 (JP) ................................ 2015-092807

(51) Int. Cl.
| | |
|---|---|
| D06F 37/20 | (2006.01) |
| C08L 23/22 | (2006.01) |
| C08L 23/28 | (2006.01) |
| C08L 23/16 | (2006.01) |
| C08L 11/00 | (2006.01) |
| C08L 9/02 | (2006.01) |
| F16F 1/36 | (2006.01) |
| F16F 15/08 | (2006.01) |

(52) U.S. Cl.
CPC ............... *D06F 37/20* (2013.01); *C08L 9/02* (2013.01); *C08L 11/00* (2013.01); *C08L 23/16* (2013.01); *C08L 23/22* (2013.01); *C08L 23/283* (2013.01); *F16F 1/3605* (2013.01); *F16F 15/08* (2013.01); *C08L 2205/06* (2013.01)

(58) Field of Classification Search
CPC .......... D06F 37/20; C08L 23/16; C08L 23/22; C08L 23/283; C08L 9/00; F16F 15/08
See application file for complete search history.

(56) References Cited

FOREIGN PATENT DOCUMENTS

| CN | 101092783 A | | 12/2007 |
|---|---|---|---|
| CN | 201077907 Y | | 6/2008 |
| CN | 101759938 A | | 6/2010 |
| JP | 5-194807 | * | 8/1993 |
| JP | H06117488 A | | 4/1994 |
| JP | H11164986 A | | 6/1999 |
| JP | 2002187987 A | | 7/2002 |
| JP | 2005-179525 | * | 7/2005 |
| JP | 2005-179525 A | | 7/2005 |
| JP | 2006204715 A | | 8/2006 |

OTHER PUBLICATIONS

JP 2005-179525, machine translation, 2005.*
JP 5-194807, machine translation, 1993.*

* cited by examiner

*Primary Examiner* — Roberto Rabago
(74) *Attorney, Agent, or Firm* — Ditthavong & Steiner, P.C.

(57) ABSTRACT

An anti-vibration rubber of the present invention is an anti-vibration rubber for washing machines. In temperature variance measurement of dynamic viscoelasticity at a frequency of 10 Hz, the anti-vibration rubber has a maximum loss factor at a temperature of 0° C. to 40° C., both inclusive, and has a loss factor of 0.5 or more in the entire temperature range of 0° C. to 40° C., both inclusive, at the frequency of 10 Hz.

6 Claims, 5 Drawing Sheets

VULCANIZED ANTI-VIBRATION RUBBER

CROSS-REFERENCES TO RELATED APPLICATIONS

This application claims priority from PCT Application Serial No. PCT/JP2016/063335, filed on Apr. 28, 2016, which claims priority from Japanese Patent Application Serial No. 2015-092807, filed on Apr. 30, 2015, the contents of which are hereby incorporated herein in their entirety by this reference.

TECHNICAL FIELD

The present invention relates to anti-vibration rubbers, and more particularly to anti-vibration rubbers for washing machines.

BACKGROUND ART

Washing machines have leg rubbers, which are made of an elastic body, at the four corners of their bottom surfaces for reduced vibration and improved ease of installation. Examples of such washing machines include drum-type washing machines described in Japanese Unexamined Patent Application Publication Nos. 2006-204715 (Patent Literature 1) and H11-164986 (Patent Literature 2).

As shown in FIG. 1, a drum-type washing machine 1 disclosed in Patent Literature 1 includes: an outer cabinet 4 that has a base 3 at the bottom; a wash tub 6 that is accommodated in the outer cabinet 4 and is elastically supported on its lower side by anti-vibration means; and a spin tub 8 (drum) that is accommodated in the wash tub 6 and is driven to turn by drive means. The spin tub 8 functions as a common tub for wash, rinse, spin, and dry cycles. The drum-type washing machine of Patent Literature 1 has elastic leg rubbers 31 attached to the four corners of the base 3.

As shown in FIG. 2, a drum-type washing machine 2 of Patent Literature 2 uses a structure in which a wash tub 6 accommodating a spin tub 8 is suspended from an outer cabinet 4 by spring bodies 11. The drum-type washing machine 2 further has an anti-vibration damper 12 in order to reduce vibration when a dry cycle is started. The drum-type washing machine of Patent Literature 2 also has leg rubbers 31 under fixed legs fixed to the bottom of the outer cabinet 4.

CITATION LIST

Patent Literatures

Patent Literature 1: Japanese Unexamined Patent Application Publication No. 2006-204715
Patent Literature 2: Japanese Unexamined Patent Application Publication No. H11-164986

SUMMARY OF INVENTION

Technical Problem

The drum-type washing machine disclosed in Patent Literature 1 has a structure that is effective when expected installation locations are in buildings with low stiffness such as Japanese-style houses with wooden structures and when vibration and noise are desired to be reduced. The drum-type washing machine disclosed in Patent Literature 2 has a more standard structure than Patent Literature 1, and this structure is common in the world market.

In both of the structures of Patent Literatures 1 and 2, the drum-type washing machine operates with action and spin speed corresponding to each cycle (wash, rinse, spin, and dry). The spin speed of the drum need be increased for the spin cycle because as large a centrifugal force as possible is required to squeeze out as much water as possible. Accordingly, recent washing machines are used in the region from the start of the dry cycle (spin speed: 0 rpm) to their maximum spin speed (e.g., 1,800 rpm), and the washing machines always go through an intermediate region thereof when they are started and stopped. The washing machines are therefore temporarily used in this intermediate region. In this case, the body (outer cabinet) of the washing machine may resonate with the spin speed of the drum in a region where the spin speed of the drum matches the natural frequency of the body of the washing machine, which amplifies vibration.

In Patent Literature 1, elastic auxiliary legs are further attached between the leg rubbers in the four corners in order to restrain vibration and noise. In Patent Literature 2, the leg rubbers formed by combination of a low hardness, low resilience rubber member and a high hardness rubber member are used in order to prevent an increase in vibration in the spin cycle. However, vibration is not sufficiently reduced by the techniques disclosed in Patent Literatures 1 and 2.

In view of the above problems, it is an object of the present invention to provide an anti-vibration rubber that reduces vibration.

Solution to Problem

The inventors looked at the fact that anti-vibration rubbers for washing machines are used in the temperature range of 0° C. to 40° C., both inclusive, and conceived that vibration can be reduced by increasing a loss factor, which is an index of vibration energy absorption, in this temperature range. The inventors arrived at the idea that, for washing machines with a natural frequency in a lower spin speed region relative to their maximum spin speed, vibration can be reduced by implementing an anti-vibration rubber having a high loss factor in this lower spin speed region, and thus completed the invention.

An anti-vibration rubber of the present invention is an anti-vibration rubber for washing machines. In temperature variance measurement of dynamic viscoelasticity at a frequency of 10 Hz, the anti-vibration rubber has a maximum loss factor at a temperature of 0° C. to 40° C., both inclusive, and has a loss factor of 0.5 or more in an entire temperature range of 0° C. to 40° C., both inclusive, at the frequency of 10 Hz.

Since the anti-vibration rubber of the present invention has a maximum loss factor within the temperature range of 0° C. to 40° C., both inclusive, a high loss factor can be maintained in the temperature range in which the anti-vibration rubber for washing machines is used. Since the anti-vibration rubber has a loss factor of 0.5 or more in the entire temperature range of 0° C. to 40° C., both inclusive, at the frequency of 10 Hz, a high loss factor can always be maintained in a lower spin speed region relative to a maximum spin speed of washing machines in the temperature range in which washing machines are used. Vibration can therefore be reduced.

Preferably, the anti-vibration rubber of the present invention contains a polymer component, and the polymer component mainly contains butyl rubber. An anti-vibration rubber having a high loss factor in the temperature range of 0° C. to 40° C., both inclusive, can thus be implemented.

In the anti-vibration rubber of the present invention, it is more preferable that the butyl rubber be halogenated butyl rubber. This can reduce compression set.

It is preferable that the anti-vibration rubber of the present invention further contain a metal oxide as a vulcanizing agent. This can reduce compression set.

It is preferable that the anti-vibration rubber of the present invention further contain a tackifying resin. In the anti-vibration rubber of the present invention, it is more preferable that the tackifying resin have a melting point of 120° C. or higher. An anti-vibration rubber having a high loss factor in the temperature range of 0° C. to 40° C., both inclusive, can thus be implemented.

It is preferable that the anti-vibration rubber of the present invention further contain a processing aid. An anti-vibration rubber with improved processability can thus be implemented.

Advantageous Effects of Invention

As described above, the anti-vibration rubber of the present invention can reduce vibration.

DESCRIPTION OF EMBODIMENTS

Figure 1:
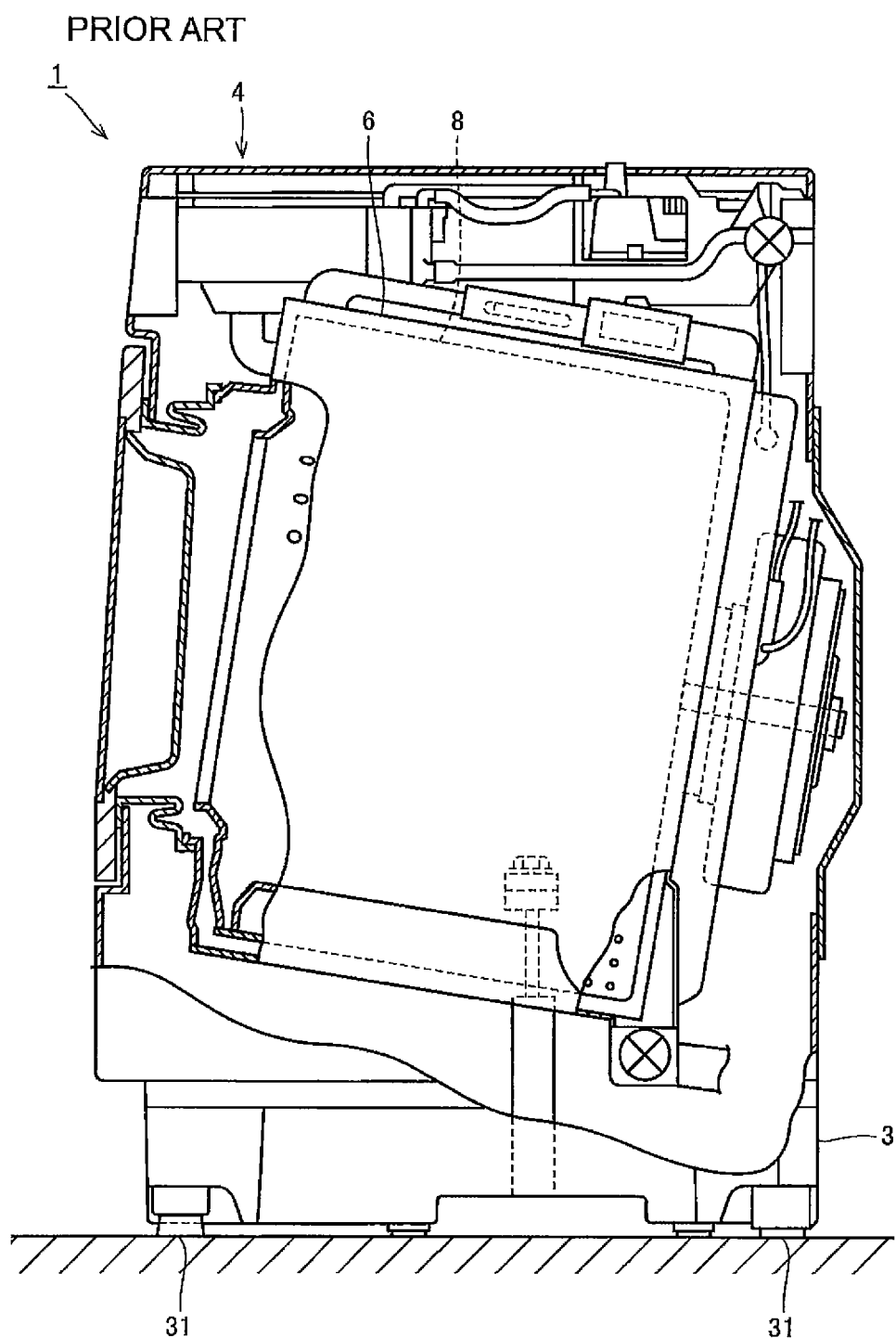
FIG. 1 is a cutaway side view schematically showing a washing machine with anti-vibration rubber which is disclosed in Patent Literature 1.

An embodiment of the present invention will be described below. In the figures described below, the same or corresponding portions are denoted with the same reference characters, and description thereof will not be repeated.

Figure 2:
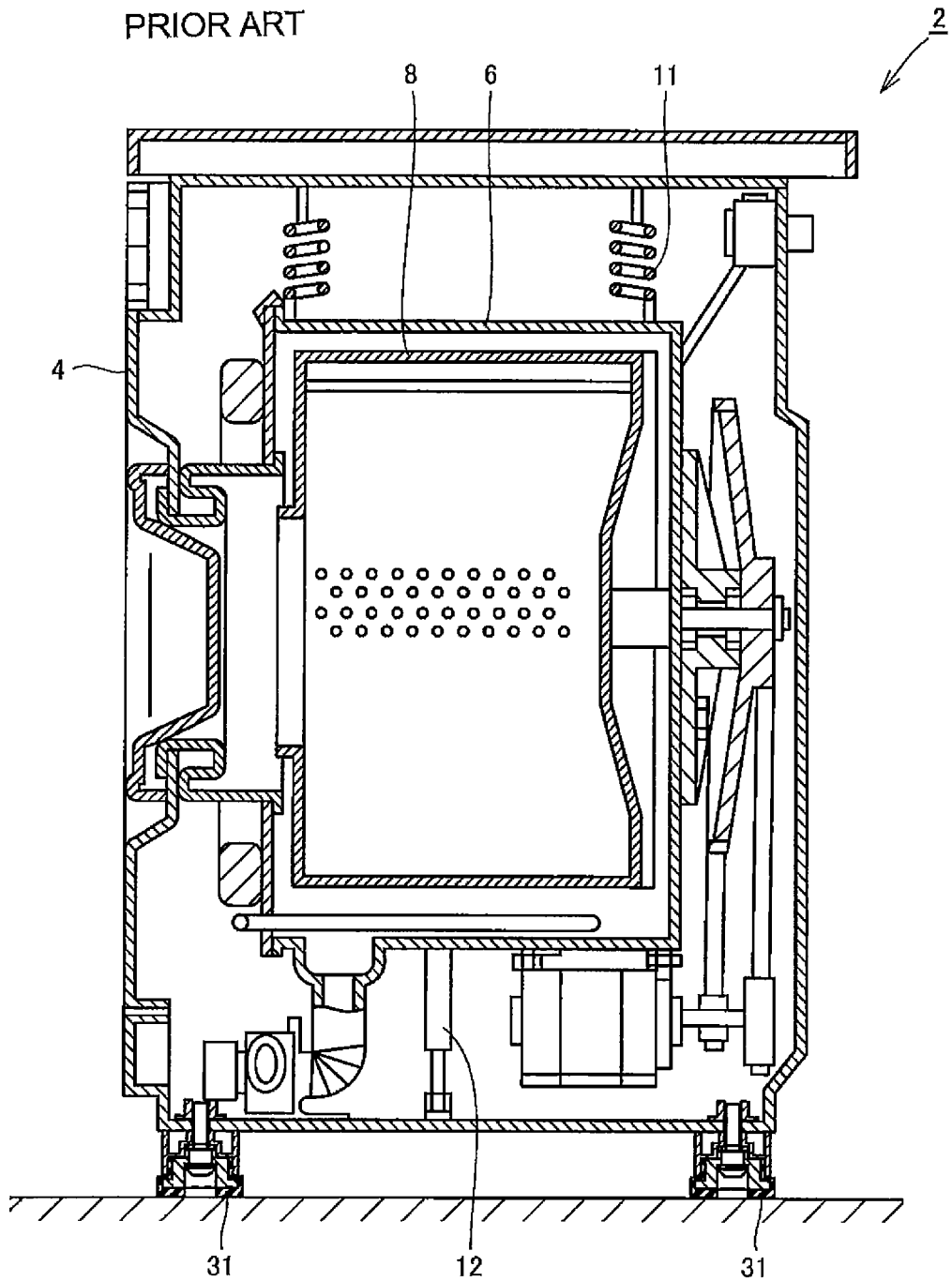
FIG. 2 is a sectional view schematically showing a washing machine with anti-vibration rubber which is disclosed in Patent Literature 2.

An anti-vibration rubber of an embodiment of the present invention is an anti-vibration rubber for washing machines. Specifically, as shown in FIGS. 1 and 2, the anti-vibration rubber of the present embodiment is used for leg rubbers 31 of washing machines and is disposed at positions similar to those of the leg rubbers 31 of FIGS. 1 and 2. The anti-vibration rubber of the present embodiment is suitably used for washing machines with a natural frequency at less than 1,000 rpm. That is, the anti-vibration rubber of the present embodiment is suitably used for washing machines including a wash tub holding therein a spin tub that turns, and an outer cabinet accommodating the wash tub and having a natural frequency at less than 1,000 rpm.

In temperature variance measurement of dynamic viscoelasticity at a frequency of 10 Hz, the anti-vibration rubber of the present embodiment has a maximum loss factor at a temperature of 0° C. to 40° C., both inclusive, preferably 10° C. to 35° C., both inclusive, and more preferably 15° C. to 30° C., both inclusive.

The anti-vibration rubber has a loss factor of 0.5 or more, preferably 0.6 or more, in the entire temperature range of 0° C. to 40° C., both inclusive, at a frequency of 10 Hz. In view of anti-vibration properties, the higher the loss factor is, the more preferable.

The "loss factor (tan δ)" is one of evaluation indices of anti-vibration properties of anti-vibration materials, and for example, is a value that is measured according to JIS K 6394 (testing methods and small testing devices for dynamic properties of vulcanized rubber and thermoplastic rubber). A high loss factor indicates that the anti-vibration rubber has a strong ability to reduce vibration.

Compression permanent set of the anti-vibration rubber is preferably 30% or less. The "compression permanent set" is a value that is measured according to JIS K 6262 (methods for determining compression set of vulcanized rubber and thermoplastic rubber at ambient, high, and low temperatures). Low compression permanent set indicates that the anti-vibration rubber has a strong ability to recover when compressed for a long period of time.

Such an anti-vibration rubber (vulcanized anti-vibration rubber) of the present embodiment is made of a rubber composition containing a polymer component, a tackifying resin, a processing aid, a vulcanizing agent, a vulcanization accelerator, and a filler. The rubber composition will be described below.

The polymer component is not particularly limited as long as it is a rubber material. However, it is preferable that the polymer component mainly contain butyl rubber. As used herein, "mainly contain" means 50 mass % or more of the total polymer component.

Examples of the butyl rubber include halogenated butyl rubber and regular butyl rubber, and halogenated butyl rubber is preferred. Examples of the halogenated butyl rubber include chlorobutyl rubber and brominated butyl rubber, and chlorobutyl rubber is preferred. Either a single kind of polymer component or a mixture of two or more kinds of polymer components may be used, but it is preferable to use a single kind of halogenated rubber. That is, it is preferable that the polymer component mainly contain halogenated butyl rubber and the remainder of the polymer component be unavoidable impurities.

The tackifying resin to be used herein has a melting point in the range of 90° C. to 150° C., both inclusive. Examples of the tackifying resin include rosin resin, terpene resin, petroleum resin, coal resin, phenolic resin, xylene resin, and coumarone resin. One of these resins may be used solely or a mixture of two or more of these resins may be used. It is preferable that the tackifying resin be one or more kinds of resins selected from the group consisting of rosin resin, terpene resin, petroleum resin, coal resin, phenolic resin, and xylene resin.

The tackifying resin preferably has a melting point of 120° C. or higher, more preferably in the range of 120° C. to 150° C., both inclusive.

The content of the tackifying resin is preferably in the range of 35 to 60 parts by mass, both inclusive, more preferably 40 to 60 parts by mass, both inclusive, per 100 parts by mass of the polymer component. In particular, the content of the tackifying resin having a melting point of 120° C. to 150° C., both inclusive, is preferably in the range of 35 to 60 parts by mass, both inclusive, more preferably 40 to 60 parts by mass, both inclusive, per 100 parts by mass of the polymer component.

The vulcanizing agent is not particularly limited. Examples of the vulcanizing agent include sulfur, a sulfur-based vulcanizing agent such as tetraalkylthiuram disulfide, a metal oxide, an organic peroxide, and a resin vulcanizing agent. One of these vulcanizing agents may be used solely or a mixture of two or more of these vulcanizing agents may be used. It is preferable that the vulcanizing agent contain a metal oxide. The metal oxide is not particularly limited. Examples of the metal oxide include zinc oxide and magnesium oxide, and zinc oxide is preferred.

The content of the vulcanizing agent is preferably in the range of 1 to 50 parts by mass, both inclusive, more preferably 3 to 10 parts by mass, both inclusive, per 100 parts by mass of the polymer component.

The vulcanization accelerator is not particularly limited. Examples of the vulcanization accelerator include thiazoles such as dibenzothiazyl disulfide, sulfenamides such as N-cyclohexyl-2-benzothiazole sulfenamide, thiurams such as tetramethylthiuram disulfide, and dithiocarbamates such as zinc dimethyldithiocarbamate. One of these vulcanization accelerators may be used solely or a mixture of two or more of these vulcanization accelerators may be used. The content of the vulcanization accelerator is preferably in the range of 0.5 to 5 parts by mass, both inclusive, per 100 parts by mass of the polymer component.

The vulcanizing agent means a compounding agent that preferentially reacts with a rubber material. The vulcanization accelerator (vulcanization accelerator aid) means a compounding agent that facilitates a reaction that is caused by the vulcanizing agent and accelerates the reaction or that increases crosslink density.

The processing aid is not particularly limited as long as it is a material that improves processability. Examples of the processing aid include stearic acid and amines. One of these processing aids may be used solely or a mixture of two or more of these processing aids may be used. The processing aid is preferably a compound having a fatty acid skeleton, more preferably stearic acid. The content of the processing aid is preferably in the range of 0.3 to 10 parts by mass, both inclusive, more preferably 0.3 to 5 parts by mass, both inclusive, per 100 parts by mass of the polymer component. If the content of the processing aid is less than 0.3 parts by mass, processability during kneading is not sufficiently improved. If the content of the processing aid is more than 10 parts by mass, compression set may be deteriorated.

The filler is not particularly limited. Examples of the filler include carbon black, silica, calcium carbonate, talc, clay, and titanium white. One of these fillers may be used solely or a mixture of two or more of these fillers may be used.

The rubber composition may further contain a softener, a plasticizer, an anti-aging agent, a reinforcing agent, etc. as appropriate in addition to the substances described above.

A method for producing the anti-vibration rubber of the present embodiment will be described below. First, a polymer component, a tackifying resin, a vulcanizing agent, a vulcanization accelerator, and a filler are kneaded with an open roll, an internal kneading machine (e.g., Intermix, kneader, or Banbury mixer), etc. to produce an unvulcanized rubber composition. Next, the rubber compression is vulcanized by, e.g., compression press molding, preferably by transfer molding etc. The anti-vibration rubber of the present embodiment can thus be produced.

EXAMPLES

The present invention will be described in more detail below based on examples. However, the present invention is not limited to the following examples.

Example 1

Table 1 shows the contents of each component and the evaluation results of Samples 1 to 10. Table 2 specifically shows the components listed in Table 1.

(Samples 1 to 4)

A polymer component, a tackifying resin, a filler, a vulcanizing agent, a vulcanization accelerator, and a processing aid were kneaded with a kneading machine as shown in Tables 1 and 2 to produce rubber compositions of Samples 1 to 4. Each of the rubber compositions of Samples 1 to 4 was then vulcanized by heating at 160° C. for 30 minutes to produce anti-vibration rubbers of Samples 1 to 4. The anti-vibration rubbers of Samples 1 to 4 contain halogenated butyl rubber as a polymer component, a tackifying resin, a filler, a processing aid, a vulcanizing agent, and a vulcanization accelerator, and the remainder is unavoidable impurities.

(Samples 5 to 7)

A polymer component, a filler, a vulcanizing agent, a vulcanization accelerator, a processing aid, and a softener were kneaded with a kneading machine as shown in Tables 1 and 2 to produce rubber compositions of Samples 5 to 7. Each of the rubber compositions of Samples 5 to 7 was then vulcanized by heating at 160° C. for 30 minutes with a molding machine to produce anti-vibration rubbers of Samples 5 to 7.

(Samples 8 to 10)

A polymer component, a tackifying resin, a filler, a vulcanizing agent, a vulcanization accelerator, and a processing aid were kneaded with a kneading machine as shown in Tables 1 and 2 to produce rubber compositions of Samples 8 to 10. Each of the rubber compositions of Samples 8 to 10 was then vulcanized by heating at 160° C. for 30 minutes to produce anti-vibration rubbers of Samples 8 to 10.

(Loss Factor)

Loss factors of the anti-vibration rubbers of Samples 1 to 10 were measured according to JIS K 6394 with a dynamic viscoelasticity measuring device Rheogel-E4000 made by UBM. The measurement was carried out under the following conditions. Test pieces of 15 mm long, 5 mm wide, and 2 mm thick were used and were strained in the vertical direction at a test interval (interval between upper and lower chucks) of 10 mm, initial strain (mean strain) of 10% (1 mm), amplitude of ±0.02% (±2 μm), and a frequency of 10 Hz. The results are shown in Table 1 and FIGS. 3 and 4.

(Evaluation Method)

Anti-vibration properties, processability, and compression permanent set were measured for the anti-vibration rubbers of Samples 1 to 10.

Figure 5:
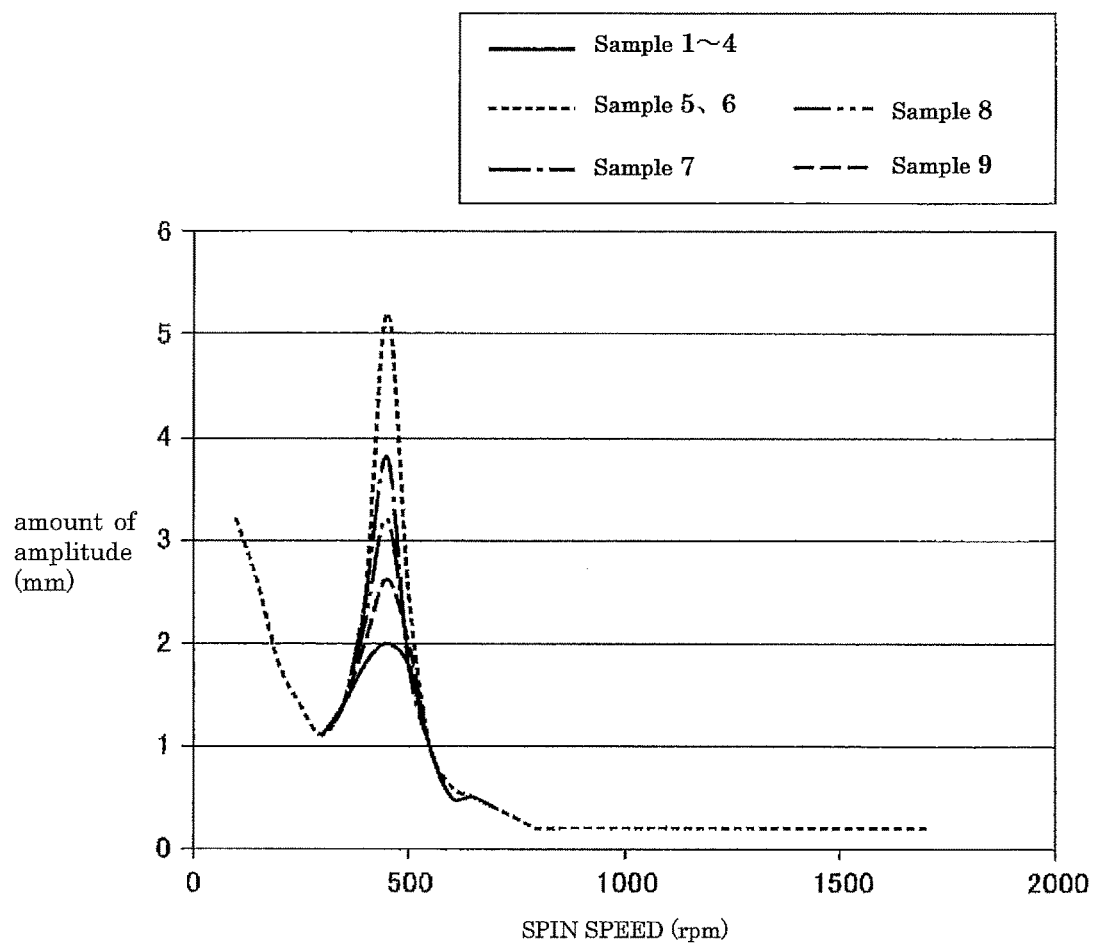
FIG. 5 is a graph showing the amounts of amplitude measured with the anti-vibration rubbers of Samples 1 to 9 being attached to washing machines.

For anti-vibration properties, the anti-vibration rubbers of Samples 1 to 10 were used as leg rubbers of washing machines with a natural frequency at 450 rpm, and vibration amplitude (amount of amplitude) at 25° C. was measured. The results are shown in FIG. 5 and Tables 1 and 3. Regarding "Anti-Vibration Properties" in Table 1, "X" indicates that the amount of amplitude at the natural frequency of the washing machine was 2.2 mm or less, and "Y" indicates that the amount of amplitude at the natural frequency of the washing machine was more than 2.2 mm. In Table 3, "Ratio" indicates the value of the amount of amplitude of each sample relative to the amount of amplitude of the anti-vibration rubbers of Samples 5 and 6 at the natural frequency of the washing machine being 1.00, and "Rate of Decrease" indicates the rate (%) of decrease in amount of amplitude relative to the amount of amplitude of the anti-vibration rubbers of Samples 5 and 6 at the natural frequency of the washing machines being 100%.

Processability was determined based on whether the unvulcanized rubber adhered to the kneading machine in the kneading process or not. The results are shown in Table 1. In Table 1, "X" indicates that there was no adhesion of the unvulcanized rubber and thus indicates satisfactory processability.

Compression set (c-set) was measured according to JIS K 6262 after storage at a temperature of 100° C. and a compression rate of 25% for 24 hours. The results are shown in Table 1.

TABLE 1

|  |  | Sample 1 | Sample 2 | Sample 3 | Sample 4 | Sample 5 | Sample 6 | Sample 7 | Sample 8 | Sample 9 | Sample 10 |
|---|---|---|---|---|---|---|---|---|---|---|---|
| Polymer Component | A | 100 | 100 | 100 | 100 |  |  | 100 | 100 | 100 |  |
|  | B |  |  |  |  | 100 |  |  |  |  |  |
|  | C |  |  |  |  |  | 100 |  |  |  |  |
|  | D |  |  |  |  |  |  |  |  |  | 100 |
| Tackifying Resin | A | 40 |  |  |  |  |  |  |  |  |  |
|  | B |  | 60 |  |  |  |  |  |  |  |  |
|  | C |  |  | 55 |  |  |  |  |  |  |  |
|  | D |  |  |  | 55 |  |  |  |  |  |  |
|  | E |  |  |  |  |  |  |  |  | 25 |  |
|  | F |  |  |  |  |  |  |  | 10 |  |  |
|  | G |  |  |  |  |  |  |  |  |  | 20 |
| Filler | A | 55 | 60 | 60 | 60 | 60 | 40 | 20 | 55 | 65 | 40 |
|  | B |  |  |  |  |  |  | 20 |  |  |  |
|  | C |  |  |  | 40 |  |  |  |  |  |  |
| Softener | A |  |  |  |  | 20 |  | 15 |  |  |  |
|  | B |  |  |  |  |  | 10 |  |  |  |  |
| Processing Aid | A | 0.3 | 1 | 1 | 3 | 1 | 1 | 1 | 1 | 1 | 1 |
|  | B |  |  |  | 2 |  |  |  |  |  |  |
| Vulcanizing Agent | A | 5 | 5 | 5 | 5 |  | 5 | 5 | 5 | 5 |  |
|  | B |  |  |  |  | 2 |  |  |  |  | 2 |
|  | C |  |  |  |  |  |  |  |  |  |  |
|  | D |  |  |  |  |  |  |  |  |  |  |
| Vulcanization Accelerator | A |  |  |  |  | 5 |  |  |  |  | 5 |
|  | B | 1 | 1 | 1 | 1 |  |  | 1 | 1 | 1 |  |
| Vulcanization Accelerator Aid | C |  |  |  |  |  | 1 |  |  |  |  |
|  | D |  |  |  |  |  | 4 |  |  |  |  |
| Peak tan δ Temperature (° C.) |  | 18 | 28 | 25 | 22 | −40 or lower | −27 | −33 | −18 | −5 | 17 |
| tan δ (25° C./10 Hz) |  | 1.22 | 1.25 | 1.25 | 1.23 | 0.16 | 0.12 | 0.25 | 0.45 | 0.67 | 0.95 |
| Anti-Vibration Properties |  | X | X | X | X | Y | Y | Y | Y | Y | Y |
| Processability |  | X | X | X | X | X | X | X | X | X | X |
| Compression Set (%) |  | 16 | 17 | 16 | 25 | 18 | 14 | 9 | 10 | 11 | 70 |

TABLE 2

|  |  | Compound | Trade Name | Company Name |
|---|---|---|---|---|
| Polymer Component | A | Chlorobutyl Rubber | Chlorobutyl 1066 | JSR Corporation |
|  | B | EPDM | EP-33 | JSR Corporation |
|  | C | CR | SKYPRENE B-5A | Tosoh Corporation |
|  | D | NBR | N215 | JSR Corporation |
| Tackifying Resin | A | Hydrogenated Terpene Resin | CLEARON P150 | YASUHARA CHEMICAL CO., LTD. |
|  | B | Hydrogenated Petroleum Resin | I-MARV P-125 | Idemitsu Kosan Co., Ltd. |
|  | C | Alicyclic Saturated Hydrocarbon Resin | ARKON P-120 | ARAKAWA CHEMICAL INDUSTRIES, LTD. |
|  | D | Aromatic Modified Terpene Resin | YS RESIN TO125 | YASUHARA CHEMICAL CO., LTD. |
|  | E | Aromatic Modified Terpene Resin | YS RESIN TO105 | YASUHARA CHEMICAL CO., LTD. |
|  | F | Alicyclic Saturated Hydrocarbon Resin | ARKON P-100 | ARAKAWA CHEMICAL INDUSTRIES, LTD. |
|  | G | Coumarone Resin | G-90 | NITTO CHEMICAL CO., LTD. |
| Filler | A | Carbon Black | N774 | GAZPROM |
|  | B | MT carbon | Thermax N990 | Cancarb Limited |
|  | C | Calcium Carbonate | Silver-W | SHIRAISHI CALCIUM KAISHA, LTD. |
| Softener | A | Paraffinic Process Oil | SUMPAR 110 | JAPAN SUN OIL COMPANY, LTD. |
|  | B | Naphthenic Process Oil | NCL-22 | TANIGUCHI SEKIYU KK |
| Processing Aid | A | Stearic Acid | LUNAC S-70 | Kao Corporation |
|  | B | Mixture of Metal Salt of Fatty Acid and Ester | Exton L-7 | Kawaguchi Chemical Industry Co,. LTD. |
| Vulcanizing Agent | A | Zinc Oxide | Zinc Oxide | THE HONJO CHEMICAL CORPORATION |
|  | B | Dicumylperoxide | PERCUMYL D | NOF CORPORATION |
|  | C | Sulfur | SULFAX A | Tsurumi Chemical Industry Co., ltd. |
|  | D | Alkylphenol Formaldehyde Resin | TACKIROL 201 | Taoka Chemical Co., Ltd. |
| Vulcanization Accelerator | A | Zinc Oxide | Zinc Oxide | THE HONJO CHEMICAL CORPORATION |
|  | B | ZnEDC | NOCCELER Ez | OUCHI SHINKO CHEMICAL INDUSTRIAL CO., LTD. |
|  | C | ETU | SANCELLER 22C | SANSHIN CHEMICAL INDUSTRY CO., LTD. |
| Vulcanization Accelerator Aid | D | Magnesium Oxide | Magnesium Oxide 1000-1 | Kyowa Chemical Industry Co., Ltd. |

TABLE 3

|  | Amount of Amplitude (mm) | Ratio | Rate of Decrease (%) |
|---|---|---|---|
| Sample 1~4 | 2.0 | 0.38 | 61.5 |
| Sample 5.6 | 5.2 | 1.00 | — |
| Sample 7 | 3.8 | 0.73 | 26.9 |
| Sample 8 | 3.2 | 0.62 | 38.5 |
| Sample 9 | 2.6 | 0.50 | 50.0 |

(Evaluation Results)

Figure 3:
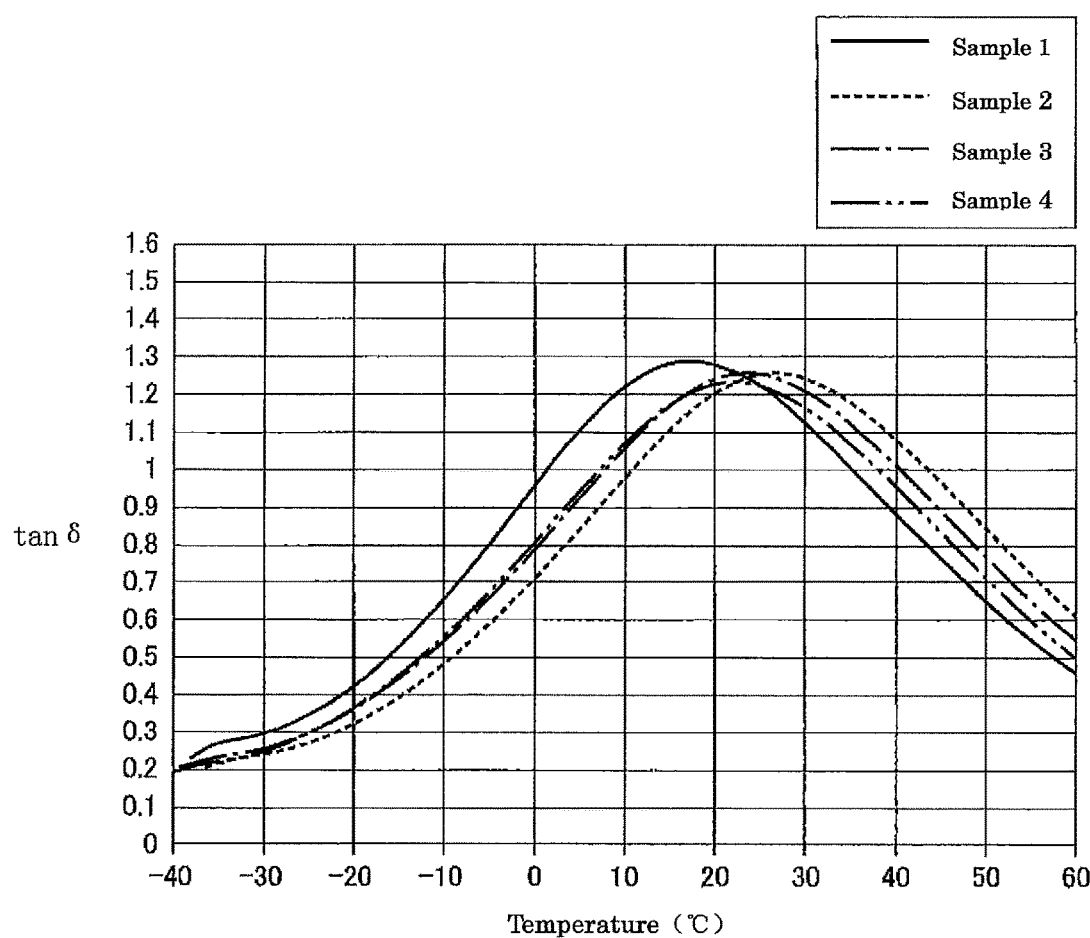
FIG. 3 is a graph showing loss factors of anti-vibration rubbers of Samples 1 to 4.

As shown in FIG. 3 and Table 1, in temperature variance measurement of dynamic viscoelasticity at a frequency of 10 Hz, each of the anti-vibration rubbers of Samples 1 to 4 had a maximum loss factor at a temperature of 0° C. to 40° C., both inclusive, and had a loss factor of 0.5 or more in the entire temperature range of 0° C. to 40° C., both inclusive, at the frequency of 10 Hz.

Figure 4:
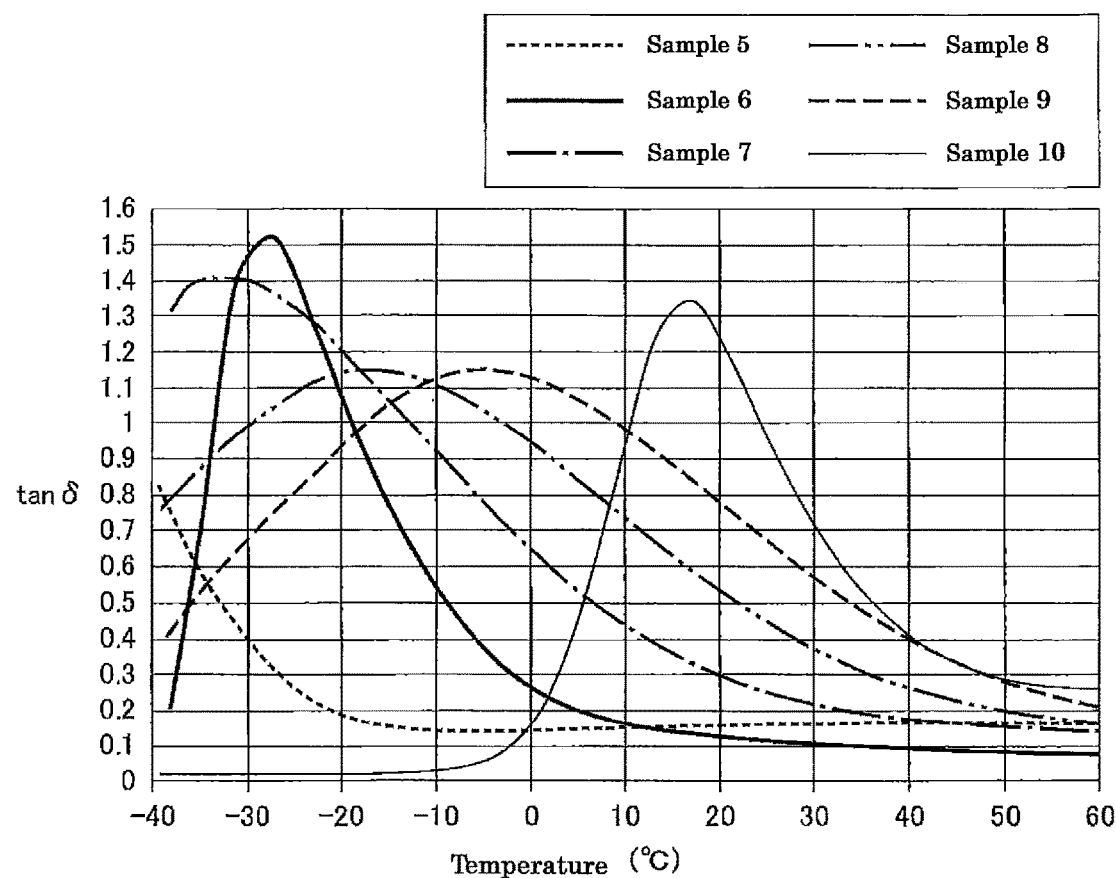
FIG. 4 is a graph showing loss factors of anti-vibration rubbers of Samples 5 to 10.

As shown in FIG. 4 and Table 1, in temperature variance measurement of dynamic viscoelasticity at a frequency of 10 Hz, each of the anti-vibration rubbers of Samples 5 to 9 had a maximum loss factor at a temperature of −5° C. or lower, and each of the anti-vibration rubbers of Samples 5 to 10 had a loss factor of less than 0.5 in a part of the temperature range of 0° C. to 40° C., both inclusive, at the frequency of 10 Hz.

As shown in FIG. 5 and Table 3, regarding the anti-vibration rubbers of Samples 1 to 4, each having a maximum loss factor at a temperature of 0° C. to 40° C., both inclusive, and having a loss factor of 0.5 or more in the entire temperature range of 0° C. to 40° C., both inclusive, at the frequency of 10 Hz, their amounts of amplitude at the natural frequency of the washing machine were able to be reduced as compared to Samples 5 to 9. It is therefore found that the anti-vibration rubbers of Samples 1 to 4 achieve low vibration. The amounts of amplitude of the anti-vibration rubbers of Samples 1 to 4 were small as shown in FIG. 5 and Table 3. It is therefore found that the anti-vibration rubbers of Samples 1 to 4 can reduce noise.

Although not shown in FIG. 5, the anti-vibration rubber of Sample 10 has a high loss factor at around 20° C. at the frequency of 10 Hz, but a high loss factor cannot be maintained in the low temperature range of 0° to 5° C. It was thus confirmed the anti-vibration rubber of Sample 10 had poor anti-vibration properties.

According to Example 1, it was confirmed that anti-vibration rubbers having a maximum loss factor at a temperature of 0° C. to 40° C., both inclusive, and having a loss factor of 0.5 or more in the entire temperature range of 0° C. to 40° C., both inclusive, at the frequency of 10 Hz in temperature variance measurement of dynamic viscoelasticity at the frequency of 10 Hz can reduce vibration when attached to washing machines. In particular, it was confirmed that the anti-vibration rubber of the present invention is suitably used for washing machines with a natural frequency at less than 1,000 rpm.

It was also confirmed that anti-vibration rubbers having a maximum loss factor at a temperature of 0° C. to 40° C., both inclusive, and having a loss factor of 0.5 or more in the entire temperature range of 0° C. to 40° C., both inclusive, at the frequency of 10 Hz in temperature variance measurement of dynamic viscoelasticity at the frequency of 10 Hz can be implemented by using a rubber composition containing a polymer component mainly containing butyl rubber, a tackifying resin, and a metal oxide serving as a vulcanizing agent. In particular, it was confirmed that it is preferable that the tackifying resin have a melting point of 120° C. or higher and the content of the tackifying resin be 35 to 60 parts by mass, both inclusive, per 100 parts by mass of the polymer component.

Example 2

Table 4 shows the contents of each component and the evaluation results of Samples 2, 11, and 12. Sample 2 in Table 4 is the same as Sample 2 in Table 1. Components of Samples 11 and 12 are specifically shown in Table 2.

(Samples 11 and 12)

A polymer component, a tackifying resin, a filler, a vulcanizing agent, a vulcanization accelerator, and a processing aid were kneaded with a kneading machine as shown in Tables 2 and 4 to produce a rubber composition of Sample 11. In addition, a polymer component, a tackifying resin, a filler, a vulcanizing agent, and a vulcanization accelerator were kneaded with a kneading machine as shown in Tables 2 and 4 to produce a rubber composition of Sample 12. Each of the rubber compositions of Samples 11 and 12 was then vulcanized by heating at 160° C. for 30 minutes to produce anti-vibration rubbers of Samples 11 and 12. A sulfur-based vulcanizing agent was used as a vulcanizing agent of Sample 11, and a resin vulcanizing agent was used as a vulcanizing agent of Sample 12. In Samples 11 and 12, zinc oxide was used as a vulcanization accelerator.

(Evaluation Method)

As in Example 1, anti-vibration properties, processability, and compression set were measured for Samples 11 and 12. The results are shown in Table 4. Regarding processability in Table 4, "Y" indicates there was adhesion of unvulcanized rubber and thus indicates poor processability.

TABLE 4

|  |  | Sample 2 | Sample 11 | Sample 12 |
|---|---|---|---|---|
| Polymer Component | A | 100 | 100 | 100 |
|  | B |  |  |  |
|  | C |  |  |  |
|  | D |  |  |  |
| Tackifying Resin | A |  |  |  |
|  | B | 60 | 60 | 60 |
|  | C |  |  |  |
|  | D |  |  |  |
|  | E |  |  |  |
|  | F |  |  |  |
|  | G |  |  |  |
| Filler | A | 60 | 60 | 60 |
|  | B |  |  |  |
|  | C |  |  |  |
| Softener | A |  |  |  |
|  | B |  |  |  |
| Processing Aid | A | 1 | 1 |  |
|  | B |  |  |  |
| Vulcanizing Agent | A | 5 |  |  |
|  | B |  |  |  |
|  | C |  | 2.5 |  |
|  | D |  |  | 5 |
| Vulcanization Accelerator | A |  | 5 | 5 |
|  | B | 1 |  |  |
|  | C |  |  |  |
| Vulcanization Accelerator Aid | D |  |  |  |
| Peak tanδTemperature (° C.) |  | 28 | 27 | 30 |
| tanδ(25° C./10 Hz) |  | 1.25 | 1.23 | 1.28 |
| Anti-Vibration Properties |  | X | X | X |
| Processability |  | X | X | Y |
| Compression Set (%) |  | 17 | 40 | 9 |

(Evaluation Results)

In temperature variance measurement of dynamic viscoelasticity at a frequency of 10 Hz, each of the anti-vibration rubbers of Samples 11 and 12 had a maximum loss factor at a temperature of 0° C. to 40° C., both inclusive, and had a loss factor of 0.5 or more in the entire temperature range of 0° C. to 40° C., both inclusive, at the frequency of 10 Hz.

However, as shown in Table 4, Sample 2 containing a metal oxide as a vulcanizing agent exhibited lower compression set than Sample 11 containing a sulfur-based vulcanizing agent as a vulcanizing agent. Sample 2 exhibited satisfactory compression set at high temperatures, which indicates that Sample 2 has excellent long-term reliability.

Sample 2 containing a metal oxide as a vulcanizing agent and containing stearic acid as a processing aid exhibited higher processability than Sample 12 containing a resin vulcanizing agent as a vulcanizing agent and containing no processing aid.

Referring to Table 1, Sample 1, 3, and 4 also contain a metal oxide as a vulcanizing agent and contain stearic acid as a processing aid. Accordingly, it was found that, like Sample 2 shown in Table 4, Samples 1, 3, and 4 also exhibited satisfactory compression set and high processability.

It was found from Example 2 that the use of a metal oxide as a vulcanizing agent can improve compression set in addition to providing high anti-vibration properties and that addition of a processing aid can further improve processability.

The embodiment and examples disclosed herein are by way of example in all respects and should not be interpreted as restrictive. The scope of the present invention is defined by the claims rather than by the above embodiment and examples, and the invention is intended to cover all changes and modifications within the spirit and scope of the invention as defined by the claims.

REFERENCE SIGNS LIST

| | | | |
|---|---|---|---|
| 1, 2 | Drum-Type Washing Machine | | |
| 3 | Base | 4 | Outer Cabinet |
| 6 | Wash Tub | 8 | Spin Tub |
| 11 | Spring Body | 12 | Anti-Vibration Damper |
| 31 | Leg Rubber | | |

The invention claimed is:

1. A washing machine comprising a vulcanized anti-vibration rubber, wherein:
   in a temperature variance measurement of dynamic viscoelasticity at a frequency of 10 Hz, said vulcanized anti-vibration rubber has a maximum loss factor at a temperature of 0° C. to 40° C., both inclusive,
   said vulcanized anti-vibration rubber has a loss factor of 0.5 or more in an entire temperature range of 0° C. to 40° C., both inclusive, at the frequency of 10 Hz,
   said vulcanized anti-vibration rubber comprises a polymer component,
   said polymer component consisting essentially of a butyl rubber,
   said vulcanized anti-vibration rubber comprises a leg rubber of the washing machine,
   the washing machine comprises: a wash tub including a spin tub configured to turn, and an outer cabinet accommodating the wash tub and including a natural frequency at less than 1,000 rpm, and
   a measurement of the loss factor is performed under the following conditions: test pieces of 15 mm long, 5 mm wide, and 2 mm thick are used and strained in the vertical direction at a test interval of 10 mm, initial strain of 1 mm, amplitude of ±2 and a frequency of 10 Hz.

2. The washing machine according to claim 1, wherein: said butyl rubber comprises a halogenated butyl rubber.

3. The washing machine according to claim 1, wherein: said vulcanized anti-vibration rubber further comprises a metal oxide as a vulcanizing agent.

4. The washing machine according to claim 1, wherein: said vulcanized anti-vibration rubber further comprises a tackifying resin.

5. The washing machine according to claim 4, wherein: said tackifying resin has a melting point of 120° C. or higher.

6. The washing machine according to claim 1, wherein: said vulcanized anti-vibration rubber further comprises a processing aid.

* * * * *